United States Patent [19]

Camble et al.

[11] 3,917,824

[45] Nov. 4, 1975

[54] PHARMACEUTICAL COMPOSITIONS CONTAINING EPIDERMAL GROWTH FACTOR OR CLOSELY RELATED DERIVATIVES THEREOF FOR INHIBITING THE SECRETION OF ACIDIC GASTRIC JUICE IN WARM BLOODED ANIMALS

[75] Inventors: Roger Camble; Harold Gregory; Ernest Edward Lawrence Gerring, all of Macclesfield, England

[73] Assignee: Imperial Chemical Industries Limited, London, England

[22] Filed: Feb. 19, 1974

[21] Appl. No.: 443,770

[30] Foreign Application Priority Data
Mar. 28, 1973 United Kingdom............... 14850/73
Apr. 2, 1973 United Kingdom............... 15706/73

[52] U.S. Cl. ............................................... 424/177
[51] Int. Cl.[2].................. A61K 37/00; C07C 103/52
[58] Field of Search....... 260/112 R, 112.5; 424/177

[56] References Cited
UNITED STATES PATENTS
3,549,610   12/1970   Yamamoto et al. ................. 424/177

OTHER PUBLICATIONS
Cohen: J. Biol. Chem., 237, 1557–62, (1962).
Savage et al; J. Biol. Chem., 247, 7612–21, (1972).
Kobayashi et al.; J. Pharm. Soc. Japan, 92, 221–5, (1972).

Primary Examiner—Lewis Gotts
Assistant Examiner—Reginald J. Suyat
Attorney, Agent, or Firm—Cushman, Darby & Cushman

[57] ABSTRACT

The use of Epidermal Growth Factor, a known polypeptide, and closely related derivatives for inhibiting the secretion of acidic gastric juice in warm blooded animals, and pharmaceutical compositions enabling this use to be carried out.

2 Claims, No Drawings

PHARMACEUTICAL COMPOSITIONS CONTAINING EPIDERMAL GROWTH FACTOR OR CLOSELY RELATED DERIVATIVES THEREOF FOR INHIBITING THE SECRETION OF ACIDIC GASTRIC JUICE IN WARM BLOODED ANIMALS

This invention relates to pharmaceutical compositions containing polypeptides and to the use of such polypeptides or compositions in gastroenterology.

It is known, for example from The Journal of Biological Chemistry, Vol. 237, pages 1555–1562 (1962) and Vol. 247, pages 7609–7611 (1972), that a polypeptide may be isolated from the submaxillary glands of adult male mice which exhibits growth stimulating activity on various epidermal and epithelial tissues. In particular it causes early opening of the eyelids of new born mice and also early eruption of the incisor teeth of new born mice. This polypeptide is known as Epidermal Growth Factor (EGF) and its chemical structure has been elucidated as:

|  | 5 | 10 | 15 |
|---|---|---|---|
|  | H.Asn.Ser.Tyr.Pro.Gly. | Cys.Pro.Ser.Ser.Tyr. | Asp.Gly.Tyr.Cys.Leu. |
|  | 20 | 25 | 30 |
|  | Asn.Gly.Gly.Val.Cys. | Met.His.Ile.Glu.Ser. | Leu.Asp.Ser.Tyr.Thr. |
|  | 35 | 40 | 45 |
|  | Cys.Asn.Cys.Val.Ile. | Gly.Tyr.Ser.Gly.Asp. | Arg.Cys.Gln.Thr.Arg. |
|  | 50 |  |  |
|  | Asp.Leu.Arg.Trp.Trp. | Glu.Leu.Arg-OH |  | in which the six cysteine residues are linked together in pairs by three disulphide bonds. In addition to EGF itself, three closely related polypeptides in which the sequence of amino acids follows that of EGF but in which, respectively, the six, five and two amino-acid residues at the carboxyl terminus are missing, have also been described as showing the same biological effects as EGF. [*The Journal of Biological Chemistry*, Vol. 247, pages 7612–7621 (1972)]. These three polypeptides are known as 1–47 EGF, 1–48 EGF and 1–51 EGF respectively.

While the known effects of EGF are relevant to any study of the fundamental physiology of the mouse, these effects are of no value for pharmaceutical purposes. Certainly they cannot be said to disclose any curative, preventative or even diagnostic effect for any disease or malfunction. It has now been found, and this is the basis of the present invention, that EGF, the above closely related polypeptides and their reduction products possess the property of inhibiting the secretion of acidic gastric juice. This property makes EGF and the above closely related polypeptides together with their reduction products useful for pharmaceutical purposes.

Mouse submaxillary glands are known to contain many materials exhibiting physiological effects and while it is known from the *Journal of the Pharmaceutical Society of Japan*, Vol. 92, pages 221–231 (1972) that an inhibitor of gastric acid secretion is present in these glands, the recorded properties of this inhibitor and EGF do not correspond and, before the present invention was made, there was no reason to suppose that EGF would also inhibit the secretion of acidic gastric juice.

According to the invention there is provided a method of inhibiting the secretion of acidic gastric juice in warm blooded animals, including man, which require such treatment, which comprises administering to the warm blooded animal a therapeutically effective amount of EGF, 1–47 EGF, 1–48 EGF or 1–51 EGF as hereinbefore defined, or a product obtained by reducing EGF, 1–47 EGF, 1–48 EGF or 1–51 EGF so that the cystine residues are reduced to cysteine.

The effect of EGF, its closely related polypeptides or their reduction products in inhibiting the secretion of acidic gastric juice in warm blooded animals may be demonstrated by their action in inhibiting the secretion of acidic gastric juice in dogs provided with a Heidenhain pouch and whose gastric secretion is stimulated by histamine. This physiological effect is of value in the treatment of duodenal ulcers in that it is acknowledged that a reduction in the acidity of the medium in contact with the ulcer accelerates the natural rate of healing of the ulcer.

When used to produce an inhibition of gastric acid secretion in warm blooded animals, a typical dose is from 0.1 to 10 $\mu$g./kg. administered by injection, especially intravenous or subcutaneous injection. The effect of a single intravenous injection lasts for about 1½ hours, and maintenance of a low level of acidity requires either that the dose be repeated or that a depot formulation be injected from which the active ingredient is released slowly over a more prolonged period of time. When used in man, a typical single dose is from 5 to 500 $\mu$g./man administered by injection.

EGF, a closely related polypeptide or a reduction product as defined above may be administered to a warm blooded animal for the purpose of inhibiting the secretion of acidic gastric juice in the form of a pharmaceutical composition, and so according to a further feature of the invention, there is provided a pharmaceutical composition comprising EGF, 1–47 EGF, or 1–51 EGF or a product obtained by reducing EGF, 1–47 EGF, 1–48 EGF or 1–51 EGF so that the cystine residues are reduced to cysteine, and a pharmaceutically acceptable diluent or carrier, but excluding a non-sterile solution of the above active ingredient in water or saline having a molarity less than 0.15.

The composition may be in a form suitable for oral or parenteral administration or administration through the nasal mucous membranes, for example a snuff. If the composition is for oral administration, for example a tablet or capsule, care should be taken to ensure that the composition enables sufficient active ingredient to be absorbed by the host to produce an effective response. Thus, for example, the amount of active ingredient may be increased over that theoretically required or other measures, such as coating or encapsulation, may be taken to protect the polypeptides from enzymic action in the stomach.

However, preferred compositions are those suitable for parenteral administration, i.e., by injection or infusion, and such compositions must be sterile. Examples of suitable such compositions are sterile injectable solutions or suspensions, and sterile injectable depot or slow-release formulations. An injectable solution or suspension from which the active ingredient is distributed rapidly through the host's body may contain from 0.5 – 500 μg./ml., the more dilute solutions being administered by infusion, but a depot or slow-release formulation may contain up to 2 mg. of active ingredient per dose. Particularly convenient sterile injectable compositions are sterile injectable solutions in isotonic saline or isotonic dextrose, buffered if necessary to a pH from 5 to 9, and containing from 1–100 μg./ml.

The sterile injectable compositions referred to above may be prepared as such and stored, but alternatively, the actual composition to be administered may be prepared immediately before it is to be used by adding a sterile medium to the sterile active ingredient, optionally containing another pharmaceutically-acceptable diluent, which has been previously prepared and stored under sterile conditions.

According to a further feature of the invention therefore, there is provided a pharmaceutical composition comprising a measured amount of sterile EGF, 1–47 EGF, 1–48 EGF, or 1–51 EGF or a product obtained by reducing EGF, 1–47 EGF, 1–48 EGF or 1–51 EGF so that the cystine residues are reduced to cysteine, enclosed in a vehicle which maintains its sterility.

Such a composition may consist of, for example, a known weight of a sterile sample of the active ingredient alone already for dissolution in sterile isotonic dextrose or saline and enclosed in a sterile ampoule or vial. Alternatively, it may consist of a sterile ampoule or vial containing a known weight of a sterile sample of the active ingredient mixed together with sufficient sterile dextrose or sodium chloride that on dissolution in sterile water, a sterile solution of the active ingredient in isotonic dextrose or saline is obtained. Particularly convenient such compositions are ampoules or vials containing from 10 to 200 μg. of sterile active ingredient, optionally mixed with sterile dextrose or sodium chloride in an amount calculated to give a solution for injection containing 5% w/v of dextrose or 0.9% w/v of sodium chloride after dilution with sterile water.

The effect of a test compound in inhibiting the secretion of acidic gastric juice was measured as follows:

a. Beagle dogs were prepared with a denervated gastric pouch, a denervated pouch with a fistula in the gastric remnant or with an innervated stomach pouch. All dogs used in the test method were several years post surgery.

A dog to be used to test a particular compound was fasted for 18 hours and then supported in a sling frame. A collecting vessel was attached to the pouch cannula, and a stimulant of gastric secretion, histamine, pentagastrin or methacholine, was administered by continuous intravenous or subcutaneous infusion in an amount sufficient to cause the pouch to secrete at 50–70% of their maximum output. The amount of stimulant needed varied with the dog, but in general, 30 μg. kg.$^{-1}$ hr$^{-1}$ of histamine, 1 μg. kg.$^{-1}$ hr$^{-1}$ of pentagastrin or 50 μg. kg.$^{-1}$ hr$^{-1}$ of methacholine was adequate. Acid secretion was collected over 15 minute periods, and the volume and concentration of acid were measured. When the pouch was secreting at a steady rate, the test compound was administered by intravenous injection and the acid secretion collected over 15 minute periods. The volume and acid concentration were measured, and the reduction in acid output, i.e., volume X concentration, at a maximum inhibition was expressed as a percentage of the acid output prior to administration of the test compound.

The results obtained with EGF were as follows:

| Type of pouch | Secretion stimulant | Dose of test compound | % Inhibition |
|---|---|---|---|
| Denervated | Histamine | 0.5 μg./kg. | 60–90 |
| Denervated | pentagastrin | 0.5 μg./kg. | 60–90 |
| Innervated | methacholine | 0.5 μg./kg. | 60–90 | and essentially the same results were obtained with the closely related polypeptides as defined above.

b. Rats, weighing 180–200 g. were anaesthetised with urethane administered intramuscularly and a dose of 0.2 mg. of atropine administered subcutaneously. A tracheal cannula was inserted, and a tube introduced into the cervical oesophagus until its tip lay in the stomach. A soft drainage tube was passed through the pylorus from a duodenal incision, and a jugular vein was cannulated for injections.

A rat to be used to test a particular compound was maintained at 36°–37°C. while warmed saline at pH 6.5 was pumped through the stomach and collected over 10 minute intervals. The acid content was determined by automatic titration. Histamine (300 μg.) was administered by subcutaneous injection at 1 hour intervals, and after two control responses had been obtained, a dose of test compound was administered by intravenous injection. The response to the next histamine injection was compared with the control response and the percentage inhibition calculated.

The results obtained with EGF and the closely related polypeptides were as follows:

| Dose | % Inhibition |
|---|---|
| 1–10 μg. in 0.25 ml. saline per rat | 70–90 |

The invention is illustrated but not limited by the following Examples:

EXAMPLE 1

A polypeptide, being EGF, 1-47 EGF, 1-48 EGF, 1-51 EGF or a reduction product thereof in which the original cystine residues are reduced to cysteine, is dissolved in pyrogen free 5% w/v dextrose solution to give a final concentration of 40 μg./ml. This solution is dispensed into vials in aliquots of 2.5 ml. each through a sterilising membrane filtration system, for example a 0.22 mμ 'Millipore' ('Millipore' is a trade mark) filter. The contents of each vial are then lyophilised and the vials capped and sealed under sterile conditions. The vials containing a sterile mixture of polypeptide and dextrose are stored at 4°C.

EXAMPLE 2

To a vial prepared as described in Example 1 is added 2.5 ml. of sterile water immediately before use to give a sterile injectable solution of 40 μ./ml. of polypeptide in 5% w/v dextrose solution.

EXAMPLE 3

EGF, 1-47 EGF, 1-48 EGF, 1-51 EGF or a reduction product thereof in which the original cystine residues are reduced to cysteine, (10 mg.) is dissolved in pyrogen-free water (50 ml.), and the solution is filtered through a sterilising membrane filtration system, for example a 0.22 mμ 'Millipore' filter ('Millipore' is a trade mark) into ampoules so that each ampoule receives 0.5 ml. The contents of each ampoule are then lyophilised, and the ampoules sealed under sterile conditions. The ampoules, each containing 100 μg. of sterile polypeptide, were kept at −20°C.

EXAMPLE 4

The contents of an ampoule, prepared as in Example 3, are dissolved in sterile, pyrogen-free 5% w/v dextrose solution to give a solution containing from 1 to 5 μg./ml. of polypeptide in 5% w/v dextrose solution. This solution is suitable for administration by infusion.

If a solution suitable for injection is required, the contents of an ampoule are dissolved in sterile, pyrogen-free 5% w/v dextrose solution to give a solution containing 5–50 μg./ml. of polypeptide.

Alternatively, the 5% w/v dextrose solution may be replaced by isotonic saline.

What we claim is:

1. A method of inhibiting the secretion of acidic gastric juice in warm blooded animals which require such treatment, which comprises administering by injection to the warm blooded animal a therapeutically effective amount of EGF, 1–47 EGF, 1–48 EGF or 1–51 EGF, or a reduction product of EGF, 1–47 EGF, 1–48 EGF or 1–51 EGF in which the cystine residues are reduced to cysteine.

2. A method as claimed in claim 1 wherein a dose of from 0.1 to 10 μg./kg. of active ingredient is administered by intravenous or subcutaneous injection.

* * * * *